Dec. 4, 1956     A. R. GONZALEZ     2,772,616
POWER LIFTING DEVICE APPLICABLE
TO AGRICULTURAL IMPLEMENTS
Filed Sept. 15, 1953     3 Sheets-Sheet 1
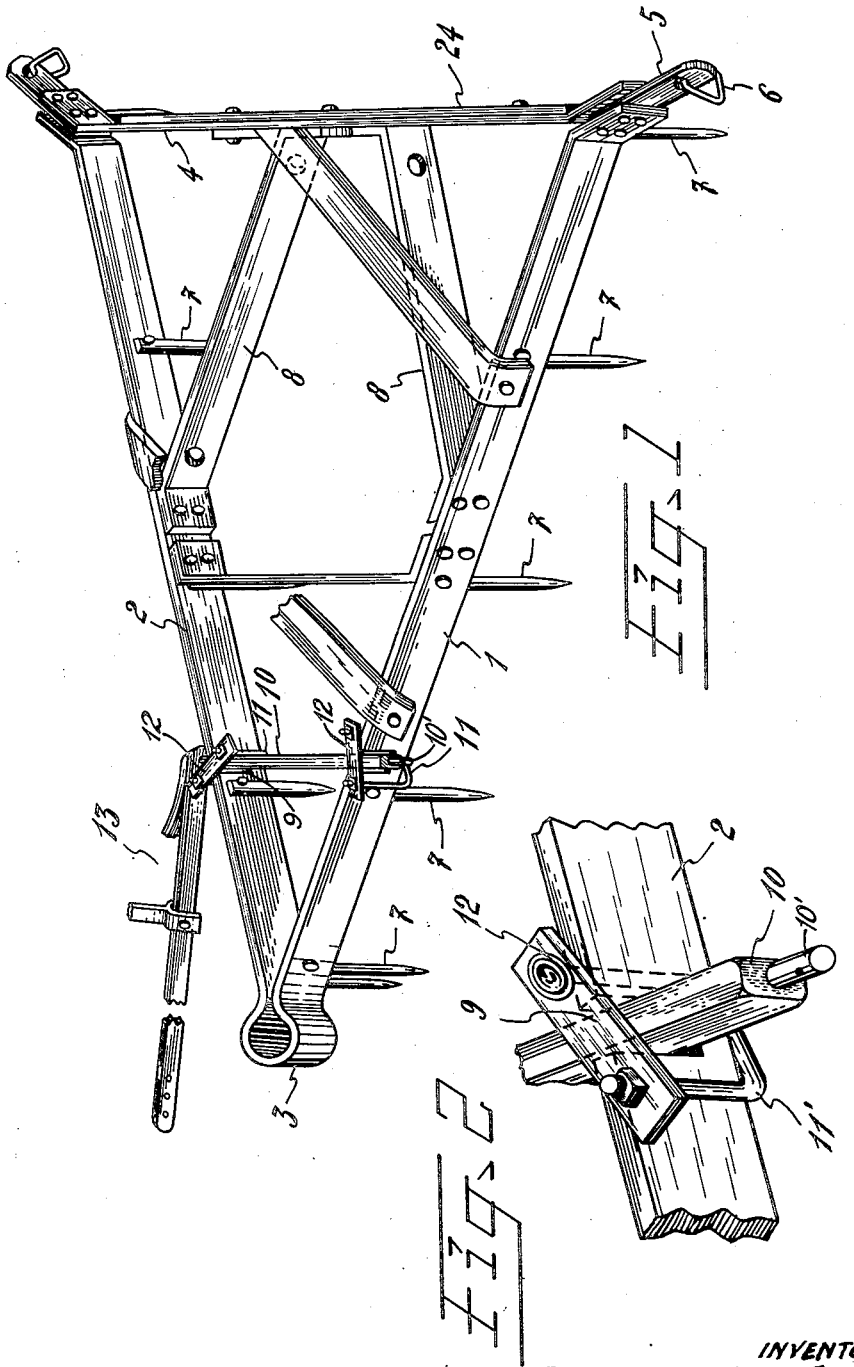
INVENTOR
Angel Rodriguez Gonzalez
BY

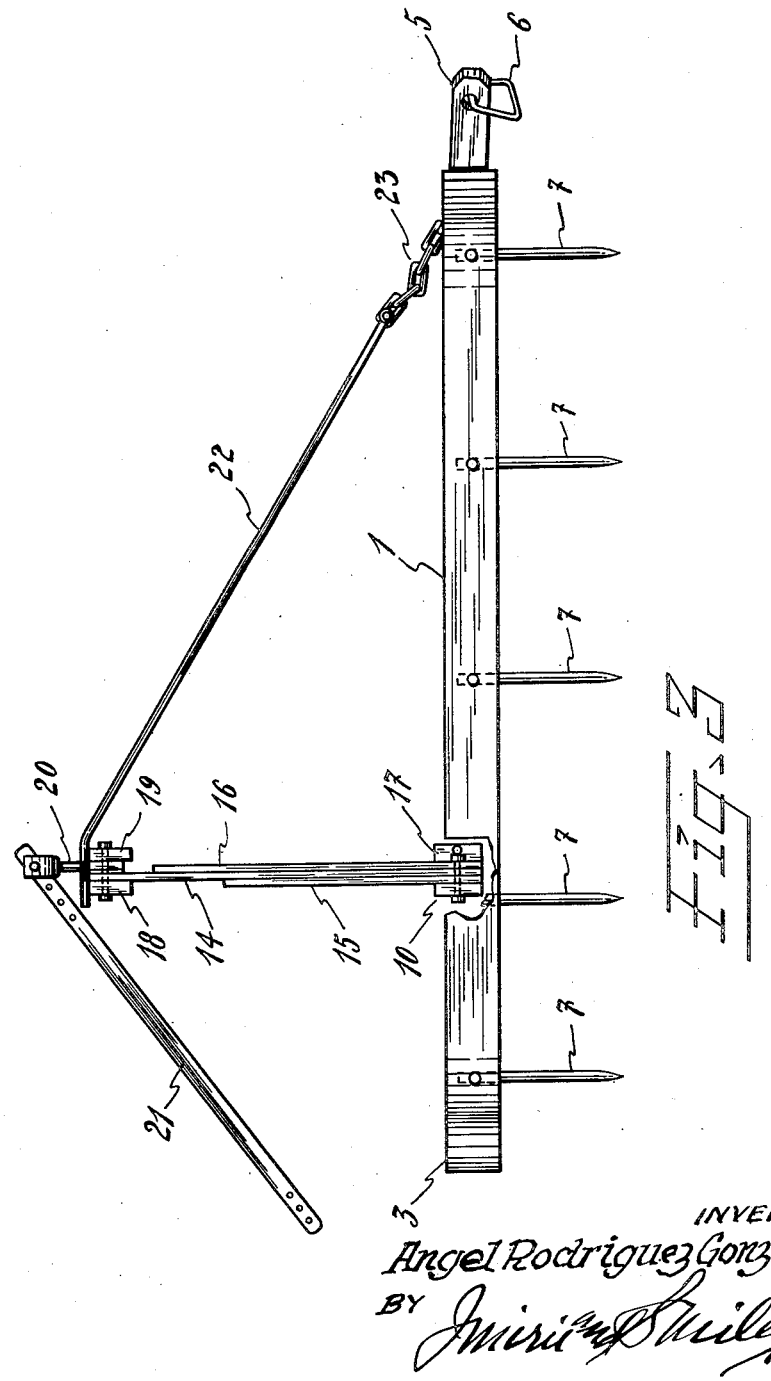

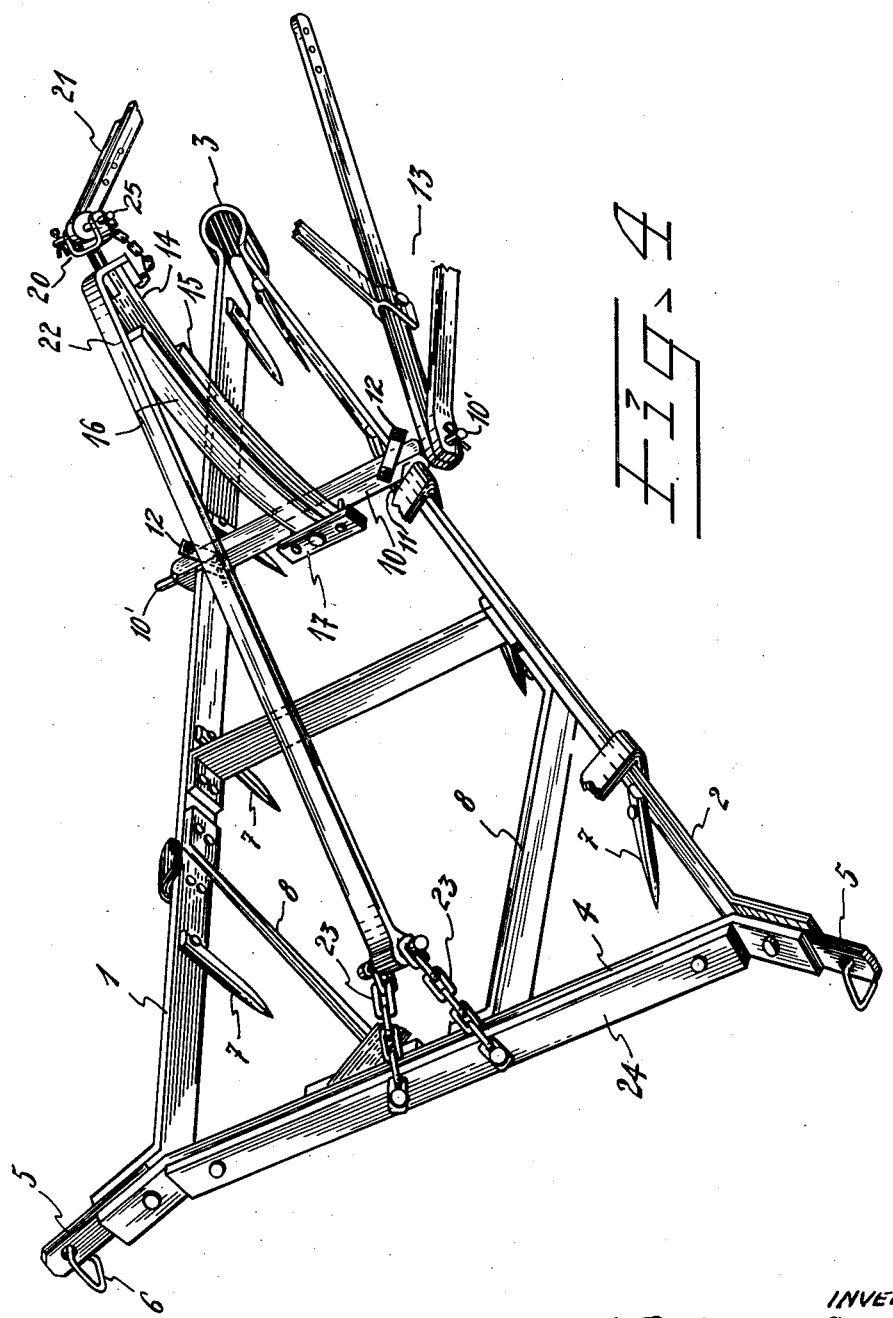

United States Patent Office 2,772,616
Patented Dec. 4, 1956

2,772,616

POWER LIFTING DEVICE APPLICABLE TO AGRICULTURAL IMPLEMENTS

Angel Rodriguez Gonzalez, Remedios, Las Villas, Cuba

Application September 15, 1953, Serial No. 380,257

1 Claim. (Cl. 97—47.62)

The usefulness of agricultural machines and implements has been acknowledged to the point that the existence of farms or estates not using them in field operations and labors is not conceivable.

My invention is applicable to agricultural implements in general and more particularly to such implements as are used to disintegrate the soil, and is intended to provide means to lift said implements at the right time, in order to pass over or obviate obstacles during tilling operations without stopping work.

The effectiveness of pronged harrows in warm climate soils, where a thick growth of weeds and shrubs abound, has been demonstrated in practice, for indented and disk harrows have the drawback of hardening the soil and plowing in the weeds, thus facilitating their further growth; while the pronged harrows are not prone to harden the soil and leave weeds and shrubs spread over the soil, allowing them to quickly dry under the sun. Pronged harrows, however, are not used more frequently because of their difficult handling, for even though hauled by a tractor, they drag the weeds and shrubs underneath the tractors' wheels or bands and, for lifting the same, the work must be stopped, whether the lifting be done hydraulically or by hand, the latter being a dangerous and exhausting toil.

The several tests to which my invention has been subjected have positively enhanced its usefulness as evidenced by the following advantages:

1. It operates by first lifting the harrow's front portion a few inches above ground (nine inches in the case of a harrow and tractor used in the tests), this fore-lifting permitting the rolled soil to pass and to be disintegrated by the rear prongs. Furthermore, if the obstacle should be a tree-trunk, a stone or a tree root, by initiating the lifting of the harrow on its front part without stopping the tractor, the only portion of the land remaining untilled will be that occupied by the obstacle itself. Since the lifting and dropping of the harrow's front part is instantly done, the harrow starts immediately to work, which results in a perfect job.

2. It allows the use of larger and therefore heavier harrows with heavier tractors; and even the use of longer and more effective prongs to disintegrate the soil and to spread shrubs and weeds, for although heavier, the lifting thereof is done by the fore-vertex, thus permitting it to be done in the same manner as above stated.

3. Due to the fact that the harrows are easier to operate, larger harrows may be used, without much difficulty, even with smaller tractors.

4. In permitting the harrow to be fully lifted while remaining coupled to the tractor, like other agricultural implements, it may be carried from place to place without altering the level of the ground nor leaving furrows therein.

So that the invention may be clearly understood, the details thereof will be described by referring to the accompanying drawings, in which equal numbers designate the same or similar parts, and in them:

Figure 1 is a perspective view of a pronged harrow, with its hauling bar, but without the lifting device.

Figure 2 is a detailed view, on a larger scale, showing how the hauling bar is coupled to the harrow's sides.

Figure 3 is a side view of a harrow with its lifting device, under the present invention, in a dropped position or lying upon the ground, a part of the side having been cut to permit seeing how the lifting device is supported.

Figure 4 is a perspective upper view showing the harrow in the position it adopts when lifted by the tractor's hydraulic power.

The drawings illustrate a prong harrow having a triangular frame with angularly disposed side members 1 and 2 joined at their front ends and connected at their rear ends by a rear member 4 which is reinforced by a bar 24. The sides 1 and 2 are formed from a single flat steel bar curved at the front vertex to form an eye 3 for coupling to the drawbar of a tractor. The ends of the rear frame member 4 are attached to the rear ends of sides 1 and 2 with suitable inserts 5 each of which carries a ring 6 to be used when it is desired to pull the harrow backward. As usual, prongs or spikes 7 are attached to and extend below the frame members 1 and 2 and the triangular frame is furnished with braces 8, as shown in Figs. 1 and 4. At a predeterminated distance back of front vertex and eye 3, the sides 1 and 2 have recesses 9 in their upper faces or edges and a crossbar 10 is clamped in said recesses by conventional U-bolts 11 and cooperative clamp plates 12. The U-bolts 11 may be threaded at both ends for receiving nuts to clamp the plate 12, as shown in Fig. 1, or the bolts may be provided with a head at one end as illustrated by the bolt 11' in Fig. 2. The crossbar 10 terminates in stub shafts 10' that project beyond the outer faces of the frame members 1 and 2 and are pivotally connected to links 13 which are adapted to be connected to the hydraulic lifting system of a tractor.

The device also comprises a flexible, erect arm composed of a long and flexible flat bar 14 of suitable material, preferably steel, braced at the front by a shorter bar 15 and at the back by a third bar 16, longer than bar 15 but shorter than bar 14. The lower ends of said three flat bars 14, 15 and 16 are firmly clamped together and to the rear face of crossbar 10, at the central portion thereof, by means of a plate 17 and bolts or rivets. Clamp plates 18 and 19, Fig. 3, are attached to the front and rear faces, respectively, of the upper end of flexible erect bar 14. A tie bar 22, having its forward end bent at an obtuse angle so as to rest evenly on the top surfaces of bar 14 and plates 18 and 19, extends backward and downward to a point at a predetermined distance from the rear frame member 4 where it is attached to the forward ends of two short chains 23 which diverge from the bar 22 and extend rearwardly over the rear frame member 4 and bar 24 and are attached to the rear face of the latter. The portion of tie bar 22 resting on top of the bar 14 and clamp plates 18 and 19 has a vertical bore downwardly through which extends the leg or stem of a Y-shaped piece 20, said stem passing between the bar 14 and plate 19 to be firmly held by the bolts clamping the plates 18 and 19 together. The Y-shaped piece projects above the top surface of tie bar 22 and the two arms of the Y straddle the rear end of a link or bar 21, said end of the link 21 being held in place by a crosspin or bolt 25 passing through aligned perforations in the arms of the Y and in link 21 so as to permit link 21 to swing vertically. The other or forward end of link or bar 21 is adapted to be attached to the hydraulic lifting system of a tractor.

The lifting device functions as follows:

When the harrow is coupled to a tractor, and the ends of the crossbar 10 and the upper end of the arm 14 are connected to the hydraulic lifting system of the tractor by link members 13 and 21, respectively, and the tractor is started, the harrow is drawn forward in its normal working position with the prongs 7 in contact with the ground. Normally, the arm 14 will be vertically straight and no strain is produced on tie bar 22 and the chains 23 will hang loosely from the latter. If an obstacle to the forward movement of the harrow is met, be it a stone, stump, roots, or the like, or trash dragged by the harrow and accumulated to such an extent that the harrow cannot work the soil properly, the operator actuates the hydraulic lifting system of the tractor to lift the ends of crossbar 10 which causes said bar together with the front end of the harrow to rise and when the elevation of said front reaches a predetermined height, the link 21 pulls the upper end of the arm 14 flexing it forwardly and thereby pulling the tie bar 22 and chains 23 forward and upward and, consequently, raising the entire harrow out of contact with the ground.

Although the invention as herein described is applied to a prong harrow, for this is a specific application, this does not imply a limitation of its scope, since the synchronized liftable device, may be applied to any other agricultural implement by introducing some alterations not affecting the spirit of the invention. I therefore pray that Letters Patent be granted to me covering the following.

I claim:

A power lifting device, applicable to agricultural implements, comprising a frame, a transverse bar fixed to and adjacent the front end of said frame, links for connecting said crossbar to the hydraulic system of a tractor, a flexible bar rising perpendicularly from said transverse bar, brace bars disposed at the front and rear of said flexible bar and fixed to said transverse bar, a tie bar extended downwardly and rearwardly from the top of said flexible bar, two divergent chains connecting the rear end of said tie bar with said frame, the forward end of said tie bar being perforated and a Y-shaped piece having a stem extending down through the perforation in said tie bar, means clamping the lower end of said stem to said flexible arm, and a link having one end pivotally connected between the arms of said Y-shaped piece with the other end of said link being adapted for attachment to the hydraulic lifting system of the tractor.

References Cited in the file of this patent

UNITED STATES PATENTS

| | | |
|---|---|---|
| Re. 22,627 | McKay | Apr. 3, 1945 |
| 2,336,152 | Rude | Dec. 7, 1943 |
| 2,591,028 | Udy | Apr. 1, 1952 |
| 2,641,071 | Brown | June 9, 1953 |